(12) United States Patent
Chanclou et al.

(10) Patent No.: US 9,537,600 B2
(45) Date of Patent: Jan. 3, 2017

(54) REFLECTING METHOD AND DEVICE FOR PERFORMING THE RECEIVING FUNCTION OF AN OPTICAL ACCESS NETWORK USING WAVELENGTH DIVISION MULTIPLEXING

(71) Applicant: ORANGE, Paris (FR)

(72) Inventors: Philippe Chanclou, Lannion (FR); Fabienne Saliou, Lannion (FR); Qian Deniel, Lannion (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/759,184

(22) PCT Filed: Jan. 9, 2014

(86) PCT No.: PCT/FR2014/050035
§ 371 (c)(1),
(2) Date: Jul. 2, 2015

(87) PCT Pub. No.: WO2014/108642
PCT Pub. Date: Jul. 17, 2014

(65) Prior Publication Data
US 2015/0341136 A1 Nov. 26, 2015

(30) Foreign Application Priority Data
Jan. 10, 2013 (FR) ..................... 13 50227

(51) Int. Cl.
*H04J 14/02* (2006.01)
*H04B 10/272* (2013.01)
(Continued)

(52) U.S. Cl.
CPC ......... *H04J 14/0221* (2013.01); *H04B 10/272* (2013.01); *H04B 10/50* (2013.01); *H04B 10/60* (2013.01); *H04J 14/025* (2013.01)

(58) Field of Classification Search
CPC ............... H04Q 11/0067; H04J 14/0278; H04J 14/0282; H04J 14/025; H04J 14/0221; H01S 3/10092; H01S 3/06754; H01S 5/0656; H04B 10/506; H04B 10/272; H04B 10/50; H04B 10/60; G02B 6/2817
(Continued)

(56) References Cited

U.S. PATENT DOCUMENTS 9,146,355 B2 * 9/2015 Babic .................. G02B 6/2817
2003/0072523 A1 4/2003 Lin et al.
(Continued)

FOREIGN PATENT DOCUMENTS

WO 2011018054 A1 2/2011
WO 2011110126 A2 9/2011

OTHER PUBLICATIONS

Nishaanthan Nadarajah et al. , "Upstream access and local customer networking in passive optical networks using a single wavelength-seeded reflective semiconductor optical amplifier," Science Direct, Jan. 2007, Optical Communications, pp. 246-251.*
(Continued)

*Primary Examiner* — Tesfaldet Bocure
(74) *Attorney, Agent, or Firm* — Haverstock & Owens LLP

(57) ABSTRACT

The invention relates to a receiving device (Rx1_b) capable of receiving an optical signal emitted by an emitting device including a light source for emitting the optical signal, the optical signal being transmitted by a passive optical network having wavelength division multiplexing, the receiving device including: an optical amplifier (Amp_b) for amplifying the optical signal received from the emitting device; an optical detector (D_b) capable of detecting data in the amplified optical signal; an optical reflector (Ref_b) config-
(Continued)

Figure 1:
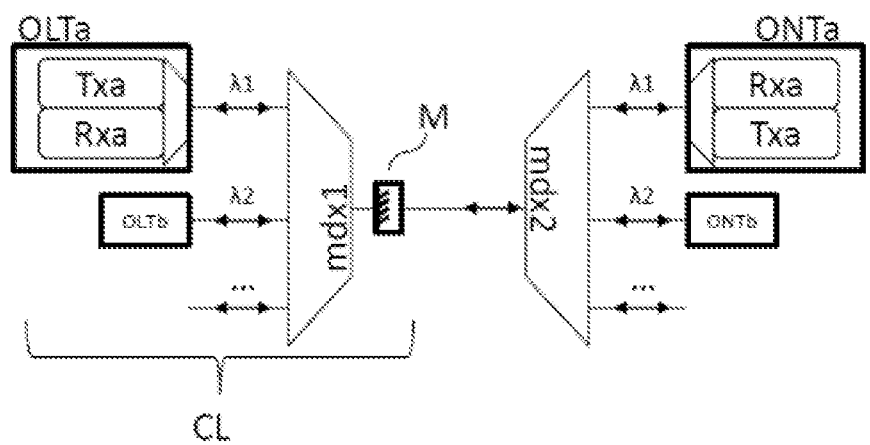

ured to return the amplified optical signal toward the emitting device, such as to tune the wavelength of the optical signal emitted by the emitting device by means of a round trip of the optical signal between the emitting device and the optical reflector.

8 Claims, 5 Drawing Sheets

(51) Int. Cl.
*H04B 10/50* (2013.01)
*H04B 10/60* (2013.01)

(58) Field of Classification Search
USPC .................................................. 398/67, 68
See application file for complete search history.

(56) References Cited

U.S. PATENT DOCUMENTS

| | | | |
|---|---|---|---|
| 2012/0020616 A1* | 1/2012 | Babi | H04J 14/02 385/27 |
| 2012/0093515 A1 | 4/2012 | Lin et al. | |
| 2012/0155876 A1* | 6/2012 | Cho | H04J 14/0282 398/65 |
| 2012/0269516 A1 | 10/2012 | Liu et al. | |
| 2016/0036531 A1* | 2/2016 | Babic | H01S 5/041 398/187 |

OTHER PUBLICATIONS

A. Sangeetha et al., "Analysis of Different Wavelength Injection Technique in Bidirectional Wavelength Division Multiplexed Passive Optical Networks," Indian Journal of Science and Technology, vol. 7(12), Dec. 2014, pp. 1978-1986.*

Qian Deniel et al., "Up to 10 Gbit/s transmission in WDM-PON architecture using external cavity laser based on self-tuning ONU", Optical Fiber Communication Conference and Exposition, 2012 and The National Fiber Optic Engineers Conference, IEE Mar. 2012, pp. 1-3.

The Preliminary International Search Report and Written Opinion from PCT/FR2014/050035.

* cited by examiner

REFLECTING METHOD AND DEVICE FOR PERFORMING THE RECEIVING FUNCTION OF AN OPTICAL ACCESS NETWORK USING WAVELENGTH DIVISION MULTIPLEXING

1. FIELD OF THE INVENTION

The invention application relates to the field of passive optical networks (or PON) serving subscribers to electronic communications services, and more particularly to that of passive optical networks using wavelength division multiplexing.

2. PRIOR ART

The architectures of optical access networks typically use a different wavelength depending on direction of transmission, the various users of a network dividing up time windows of the signal. This technique known as TDM (for Time Division Multiplexing) exhibits limits in terms of maximum data rates.

Another technique allowing higher transmission data rates, studied within standards bodies such as the SG15 group of the UIT (Union Internationale des Telecommunications), or the 802.3 group of the IEEE (International Electrical and Electronical Engineer association), consists in associating a wavelength with each user of the network. This technique is known as WDM (Wavelength Division Multiplexing).

One way of associating the wavelengths with the users is disclosed by the patent application WO 2011/110126 entitled "Self-injection optical transmitting and receiving module and wavelength division multiplexing passive optical network system". This technique, also referred to as "self-seeded", consists in allowing the system to self-organize by stabilizing itself onto one single wavelength by means of successive return journeys of the light within what is referred to as the "laser cavity", in other words the optical medium between the source of the optical signal and the point of reflection, the wavelength and its power being a function of the path followed and of its optical gain, which are unique.

A self-seeded WDM PON according to the prior art is shown in FIG. 1.

This solution introduces into the PON, in addition to the wavelength multiplexer/demultiplexer mdx1 and mdx2, a reflective optical device M allowing a part of the optical signal to return to the source OLTa, another part continuing beyond so as to reach its destination ONTa. The optical source OLTa and the reflective optical component, or mirror M, must be disposed on either side of the wavelength multiplexer/demultiplexer mdx1, because it is the latter that determines the wavelength λ1 for each transmitter/receiver pair Txa/Rxa. Similarly, other wavelengths are determined for the other transmitter/receiver pairs of the PON, such as for example λ2 for the transmitter in the optical source OLTb and the receiver in ONTb.

Typically, the optical source comprises a component called an RSOA, for "reflective semiconductor optical amplifier", or a component called an SOA, for "semiconductor optical amplifier", associated with a reflective module. Even if a single return path followed by the optical signal suffices to seed the wavelength, several trips are needed in order to stabilize the other optical characteristics, such as the optical power, which explains the role of the reflective component or module within the optical source.

One problem is that the mirror M is an element that subjects the signal to an optical loss on arrival in the destination device ONTa. In order to compensate for this loss, an amplification of the signal is associated with the reflection in the mirror M, but that requires an active optical system, in other words supplied with an electrical current, which also poses a problem because the multiplexer/demultiplexer mdx1 that the laser cavity CL has to include belongs to a PON infrastructure which is by definition passive. According to the prior art, the amplified mirror M is therefore placed on the side where it is more readily able to be powered, in other words on the side of the central processor of the operator hosting OLTa, as close as possible. This imposes even more severe constraints in the other direction, when the source of the optical signal is in ONTa. In this case, a similar reflective device will need to be placed of the other side of mdx2 with respect to ONTa, in other words near to mdx1 since it is there where it is easier to power the device. This creates a laser cavity for the source ONTa which runs the risk of being too long to be able to be used for the wavelength self-seeding, owing to the optical losses proportional to the length of the path followed by the light.

Another problem is that the addition of the mirror M between the mdx1 and mdx2 renders the entire WDM PON dedicated to the self-seeded technique, and it is no longer possible to mix transmitter/receiver pairs OLTa/ONTa according to another technology on the same PON.

One of the aims of the invention is to overcome drawbacks of the prior art.

3. DESCRIPTION OF THE INVENTION

The invention will improve the situation by means of a receiver device designed to receive an optical signal emitted by a transmitter device comprising a light source for emitting the optical signal, the optical signal being transmitted by a passive optical network with wavelength division multiplexing, the receiver device comprising:
  an optical amplifier for amplifying the optical signal received from the transmitter device;
  an optical detector designed to detect data in the amplified optical signal;
  an optical reflector configured for reflecting the amplified optical signal toward the transmitter device, so as to seed the wavelength of the optical signal emitted by the transmitter device by means of a return path followed by the optical signal between the transmitter device and the optical reflector.

According to the invention, the mirror used for the wavelength seeding is located in the receiver device. The optical signal arriving in the receiver device has not therefore been subjected to the optical losses due to the partial mirror that the prior art placed in the path between transmitter and receiver.

This disposition is counter-intuitive for those skilled in the art who would have avoided placing the mirror so far from the source. In order to compensate for the possible optical losses caused by the longer path followed by the light, the invention replaces the coupler used according to the prior art for the detection of the data, placed within the laser cavity upstream of the optical amplifier, by an optical detector situated downstream of the optical amplifier rather than in the laser cavity, according to an arrangement composed of the optical amplifier and of the optical reflector of the receiver device. It will be noted here that the optical signal detector may be just as easily integrated into the optical amplifier or into the optical reflector, or be interposed between the two.

By virtue of this optical arrangement, the optical signal no longer needs to be extracted from the laser cavity in order to be converted, a fact which leads to reduced optical losses for the wavelength seeding.

The range of the signal between the transmitter device and the receiver device can thus be increased while at the same time preserving the capacity for wavelength self-seeding. In this way, it is possible to dispose the mirror within the receiver device, which also offers other advantages which will be described in the following part.

According to one aspect of the invention, the optical detector is integrated into the optical amplifier.

Thanks to this aspect, the receiver device no longer requires any photo-detector such as a diode. The amplifier converts the photons which pass through it into photo-current which is measured directly across the terminals of the amplifier, then processed as a data signal. The implementation of the receiver device is accordingly simplified.

According to one aspect of the invention, the optical detector is integrated into the optical reflector.

Thanks to this aspect, it is possible to integrate a current component such as a diode behind a partial mirror, in other words that allows a part of the light through.

The optical reflector may for example be a partial Faraday mirror, or any other partial mirror. The part of the optical signal passing through the mirror creates a photo-current in the diode which is subsequently processed as a data signal. When a Faraday mirror is used, the amplification, which may be implemented using a semiconductor optical amplifier SOA having a gain that is highly dependent on the polarization, is only possible along one axis of polarization for all of the polarization states of the incident optical signal. One single axis of polarization has the advantage that, at a given point of the laser cavity, the optical signal after one return journey comes back in the same state of polarization as its initial state, and the signal undergoes the same displacement effects on the return journey as on the outward journey.

According to one aspect of the invention, the optical reflector comprises a polarization separator and a polarization rotator by 180°, and the optical signal received is separated according to polarization axes so as to form a first separate signal and a second separate signal, the polarization rotator and the optical amplifier being disposed so as to form a loop with the polarization separator, the first separate signal running in one direction and the second separate signal running in the other direction, the two separate signals being re-united in the polarization separator so as to form an amplified optical signal sent back to the transmitter device.

Thanks to this aspect, the device carries out an amplification along a single axis, from all of the polarization states of the incident optical signal. This allows a semiconductor optical amplifier SOA to be employed, which is a widely-available component, and which has the advantage of exhibiting an optical gain which is higher the more highly-dependent it is on the polarization.

According to another aspect of the invention, the loop comprises a coupler disposed between the amplifier and the rotator in order to extract a part of the light and to direct it toward the optical detector.

The various aspects of the device that have just been described may be implemented independently of one another or in combination with one another.

The invention also relates to an optical terminal comprising a receiver device such as that which has just been described and a transmitter device comprising a light source for emitting an optical signal.

This optical terminal is for example an ONT if it is situated at the client end, or an OLT if it is situated in the central processor of the operator. Both the ONT and the OLT possess the twin functions of transmission and of reception of optical signals.

The invention also relates to an optical transmission system comprising a transmitter device comprising a light source for emitting an optical signal, a passive optical network with wavelength division multiplexing transmitting the optical signal, the system furthermore comprising a receiver device such as that which has just been described, receiving the optical signal.

When, for example, the transmitter device is in an OLT, and the receiver device an ONT, by combining this OLT-ONT pair with a WDM PON, a solution is obtained for the implementation of the wavelength self-seeding, without the drawback of the optical losses caused by a mirror situated in the infrastructure of the PON prior to the arrival of the signal in the ONT. Also, as the mirror is no longer situated within the passive infrastructure of the PON, it is no longer absolutely necessary to dedicate the whole PON to this self-seeded technology. The OLT-ONT pairs not implementing the receiver device according to the invention can continue to use the wavelength seeding technology initially intended for the PON. Moreover, the problem of the power supply of the amplifier is solved since it is located in the ONT, which is itself powered, and no longer within the passive infrastructure.

The invention also relates to an optical transmission system comprising a passive optical network with wavelength division multiplexing transmitting an optical signal, the system furthermore comprising two optical terminals such as that which has just been described, the first emitting the optical signal, the second receiving the optical signal.

In this way, it is possible for the same OLT-ONT pair of terminals to benefit from a self-seeded transmission system according to the invention, both in the download direction and in the upload direction. This symmetry offers an advantageous simplicity which facilitates the industrial processes for manufacturing of optical terminals.

The invention lastly relates to a method for receiving an optical signal emitted by a transmitter device comprising a light source for emission of the optical signal and a passive optical network with wavelength division multiplexing transmitting the optical signal, the method comprising the following steps:
  reception of the optical signal from the passive optical network;
  amplification of the optical signal received;
  detection of data in the amplified optical signal;
  reflection of the amplified signal towards the transmitter device, in order to seed the wavelength of the optical signal emitted by the transmitter device by means of a return journey of the optical signal with the transmitter device.

This method is implemented by the receiver device according to the invention.

4. BRIEF DESCRIPTION OF THE FIGURES

Figure 2:
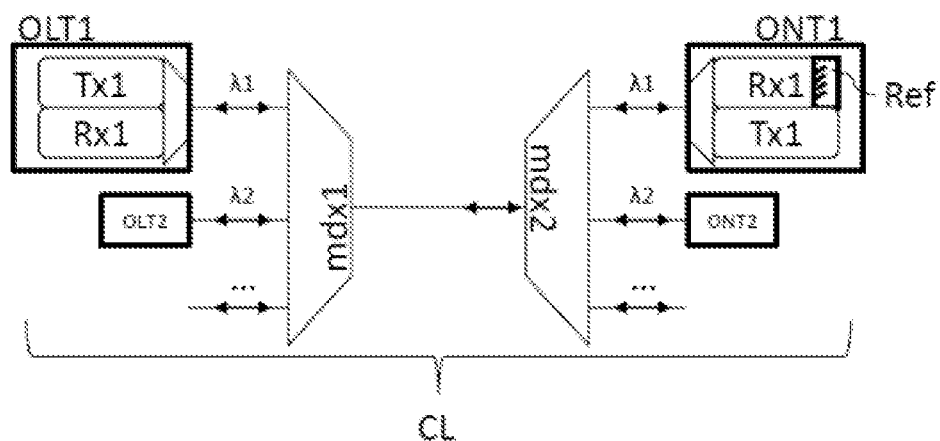
Figure 3:
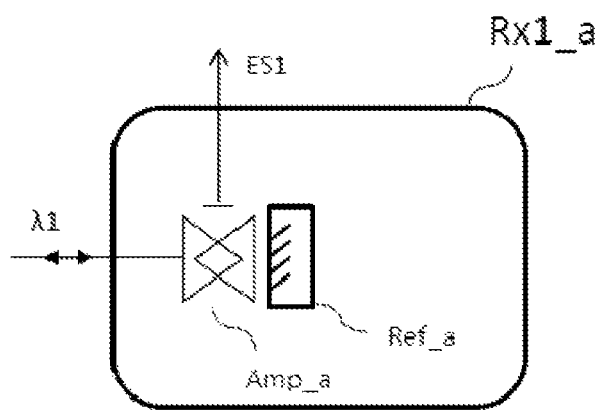
Figure 4:
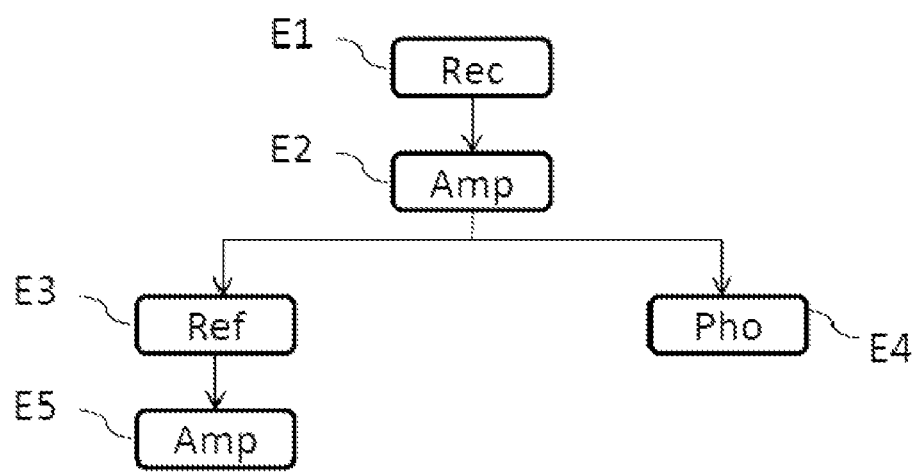
Figure 5:
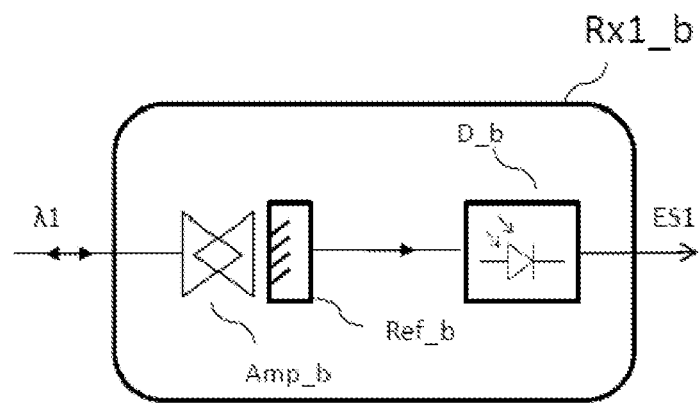
Figure 6:
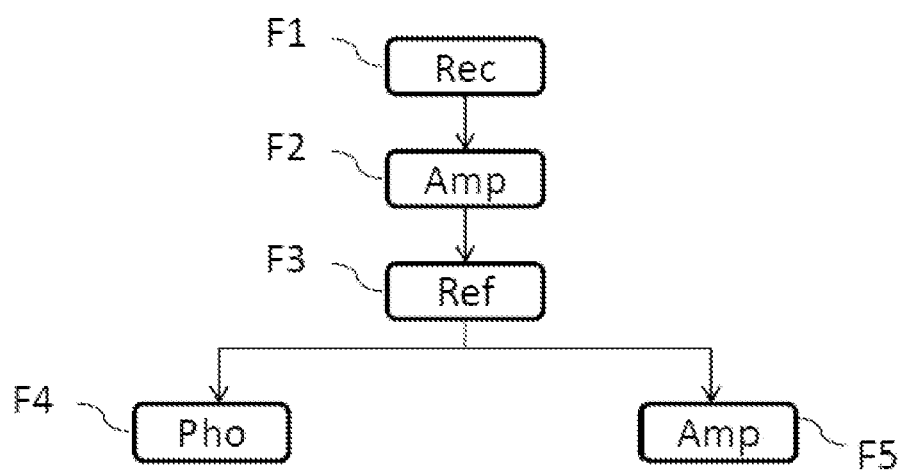
Figure 7:
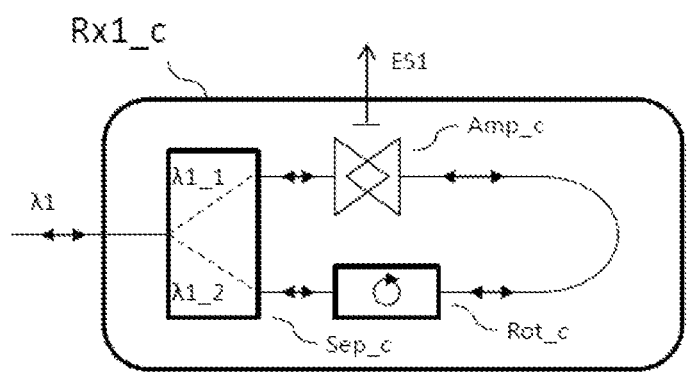
Figure 8:
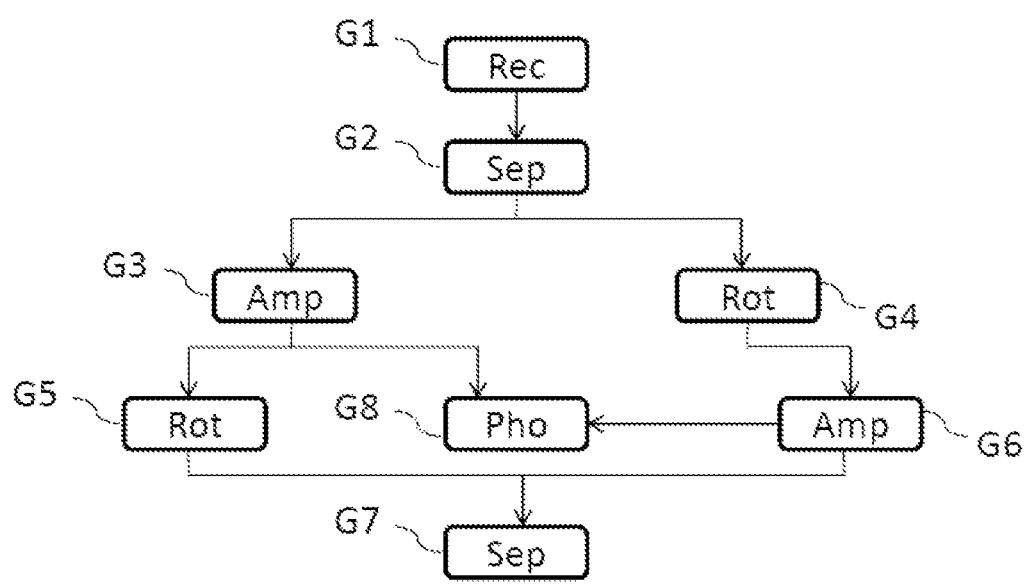
Figure 9:
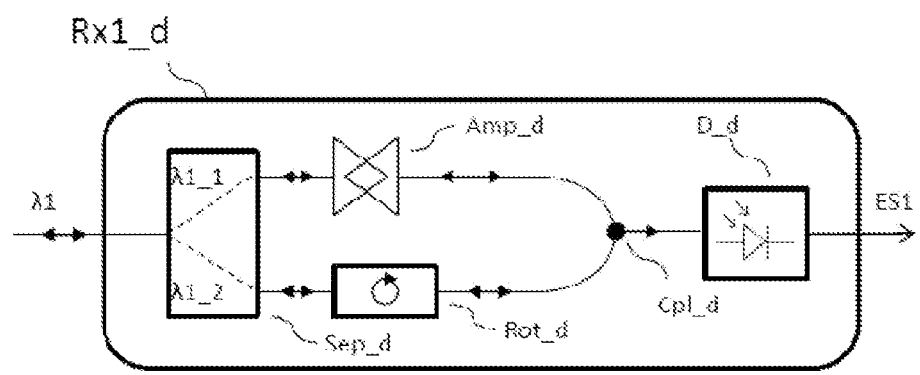
Figure 10:
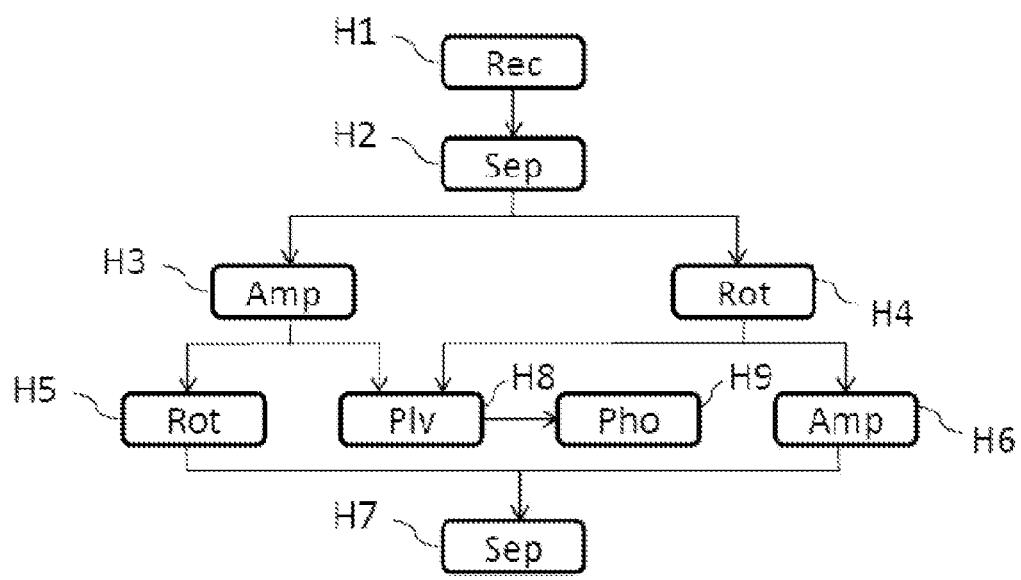

Other advantages and features of the invention will become more clearly apparent upon reading the following description of particular embodiments of the invention, given simply by way of illustrative and non-limiting example, and of the appended drawings, amongst which:

FIG. 1 shows a self-seeded WDM PON optical transmission system according to the prior art, FIG. 2 shows a self-seeded WDM PON optical transmission system, according to one particular embodiment of the invention, FIG. 3 shows the receiver device according to a first embodiment of the invention, FIG. 4 shows the method for receiving an optical signal implemented by the receiver device according to the first embodiment of the invention, FIG. 5 shows the receiver device according to a second embodiment of the invention, FIG. 6 shows the method for receiving an optical signal implemented by the receiver device according to the second embodiment of the invention, FIG. 7 shows the receiver device according to a third embodiment of the invention, FIG. 8 shows the method for receiving an optical signal implemented by the receiver device according to the third embodiment of the invention, FIG. 9 shows the receiver device according to a fourth embodiment of the invention, FIG. 10 shows the method for receiving an optical signal implemented by the receiver device according to the fourth embodiment of the invention.

5. DETAILED DESCRIPTION OF AT LEAST ONE EMBODIMENT OF THE INVENTION

In the following part of the description, several embodiments of the invention in the case of passive optical networks (PON) with wavelength division multiplexing (WDM) are presented, but the invention is also applicable to point-to-point networks.

FIG. 2 shows a self-seeded WDM PON optical transmission system, according to one particular embodiment of the invention.

In this particular embodiment of the invention, a mirror Ref is placed in the receiver device Rx1 of the optical terminal ONT1. In comparison with the system according to the prior art described with reference to FIG. 1, there is no longer any mirror M in the PON between the multiplexer/demultiplexer mdx1 and mdx2. Thus, no modification is introduced into the passive infrastructure of the WDM PON for it to be "self-seeded". Moreover, it is possible to implement the invention for certain transmitter/receiver pairs and not to do it for other pairs. It is not necessary to equip the receiver device of the optical terminal ONT2 for example.

In one variant, a second mirror Ref may also be placed in the receiver device Rx1 of the optical terminal OLT1, in order to obtain a "self-seeded" WDM PON in both directions.

FIG. 3 shows the receiver device according to a first embodiment of the invention.

In this embodiment, the device Rx1_a comprises an optical amplifier Amp_a and an optical reflector Ref_a, amplifying and reflecting all of the polarization states of the incident light. The device Rx1_a may be implemented either by means of a RSOA integrating both Amp_a and Ref_a, or by means of a SOA and of a Faraday mirror in order to respectively implement Amp_a and Ref_a. The SOA, like the RSOA, can advantageously emit along a single axis of polarization for a higher efficiency in terms of optical power.

The optical signal is photo-detected directly across the terminals of the optical amplifier Amp_a. The measurement of the electrical current generated by the photons yields the electrical signal ES1 which can subsequently be demodulated into a data signal.

FIG. 4 shows the steps of the method for receiving an optical signal implemented by the receiver device according to the first embodiment of the invention.

During a step E1, the receiver device Rx1_a receives from the WDM PON the optical signal, represented here by its wavelength $\lambda 1$, emitted by the transmitter Tx1 of a remote optical terminal such as OLT1 for example.

During a step E2, the optical signal received is amplified by the optical amplifier Amp_a.

During a step E3, the amplified optical signal is reflected by the optical reflector Ref_a.

During a step E4, the amplified optical signal is photo-detected across the terminals of the optical amplifier Amp_a, in order to generate the electrical signal ES1.

During a step E5, the reflected optical signal goes back through the optical amplifier Amp_a, before being re-emitted toward the WDM PON.

FIG. 5 shows the receiver device according to a second embodiment of the invention.

In this embodiment the device Rx1_b comprises an optical amplifier Amp_b and a partial optical reflector Ref_b, amplifying and reflecting all of the polarization states of the incident light. The device Rx1_b may be implemented either by means of an RSOA with a partial reflector incorporating both Amp_b and Ref_b, or by means of an SOA and of a partial Faraday mirror for respectively implementing Amp_b and Ref_b. The SOA, like the RSOA, can advantageously emit along a single axis of polarization for a higher efficiency in terms of optical power.

The optical signal passing through the partial mirror Ref_b without being reflected is photo-detected by a diode D_b arranged behind Ref_b. The diode D_b generates the electrical signal ES1 which can subsequently be demodulated into a data signal.

FIG. 6 shows the steps of the method for receiving an optical signal implemented by the receiver device according to the second embodiment of the invention.

During a step F1, the receiver device Rx1_b receives from the WDM PON the optical signal, represented here by its wavelength $\lambda 1$, emitted by the transmitter Tx1 of a remote optical terminal such as OLT1 for example.

During a step F2, the optical signal received is amplified by the optical amplifier Amp_b.

During a step F3, the amplified optical signal is reflected by the optical reflector Ref_b.

During a step F4, the optical signal amplified and filtered by the partial optical reflector Ref_b is photo-detected by a diode D_b, in order to generate the electrical signal ES1.

During a step F5, the reflected optical signal goes back through the optical amplifier Amp_b, prior to being re-emitted toward the WDM PON.

FIG. 7 shows the receiver device according to a third embodiment of the invention.

In this embodiment, the device Rx1_c comprises an optical amplifier Amp_c, a polarization separator Sep_c and a polarization rotator by 180° Rot_c, forming a bi-directional optical loop. The optical amplifier Amp_c may be implemented by means of an SOA. The SOA can advantageously emit along a single axis of polarization for a higher efficiency in terms of optical power.

The optical signal is photo-detected directly across the terminals of the optical amplifier Amp_c. The measurement of the electrical current generated by the photons yields the electrical signal ES1 which can subsequently be demodulated into a data signal.

FIG. 8 shows the steps of the method for receiving an optical signal implemented by the receiver device according to the third embodiment of the invention.

During a step G1, the receiver device Rx1_c receives from the WDM PON the optical signal, represented here by its wavelength $\lambda 1$, emitted by the transmitter Tx1 of a remote optical terminal such as OLT1 for example.

During a step G2, the optical signal received is separated into two signals, $\lambda 1\_1$ and $\lambda 1\_2$, by the polarization separator Sep_c.

During a step G3, the signal $\lambda 1\_1$ is amplified by the optical amplifier Amp_c.

During a step G4, the signal $\lambda 1\_2$ is processed by the polarization rotator Rot_c which flips its axes of polarization by 180°.

During a step G5, the amplified signal $\lambda 1\_1$ passes in turn through the polarization rotator Rot_c but in the other direction.

During a step G6, the signal $\lambda 1\_2$, whose polarization is now opposite, is amplified by the optical amplifier Amp_c.

During a step G7, the signals $\lambda 1\_1$ and $\lambda 1\_2$, amplified and flipped, go back through the separator Sep_c but in the other direction, in order to be re-united and re-emitted toward the WDM PON.

During a step G8, the amplified and flipped optical signal is photo-detected across the terminals of the optical amplifier Amp_c, in order to generate the electrical signal ES1.

FIG. 9 shows the receiver device according to a fourth embodiment of the invention.

In this embodiment the device Rx1_d comprises an optical amplifier Amp_d, a polarization separator Sep_d and a polarization rotator by 180° Rot_d, forming a bidirectional optical loop. The optical amplifier Amp_d may be implemented by means of a SOA. The SOA can advantageously emit along a single axis of polarization for a higher efficiency in terms of optical power.

The device Rx1_d also comprises a coupler Cpl_d extracting a part of the optical signal carried by the bidirectional optical loop. The extracted signal is photo-detected by a diode D_d generating the electrical signal ES1 which can subsequently be demodulated into a data signal.

FIG. 10 shows the steps of the method for receiving an optical signal implemented by the receiver device according to the fourth embodiment of the invention.

During a step H1, the receiver device Rx1_d receives of the WDM PON the optical signal, represented here by its wavelength $\lambda 1$, emitted by the transmitter Tx1 of a remote optical terminal such as OLT1 for example.

During a step H2, the optical signal received is separated into two signals, $\lambda 1\_1$ and $\lambda 1\_2$, by the polarization separator Sep_d.

During a step H3, the signal $\lambda 1\_1$ is amplified by the optical amplifier Amp_d.

During a step H4, the signal $\lambda 1\_2$ is processed by the polarization rotator Rot_d which flips its axes of polarization by 180°.

During a step H5, the amplified signal $\lambda 1\_1$ passes in turn through the polarization rotator Rot_d but in the other direction.

During a step H6, the signal $\lambda 1\_2$, whose polarization is now opposite, is amplified by the optical amplifier Amp_d.

During a step H7, the signals $\lambda 1\_1$ and $\lambda 1\_2$, amplified and flipped, go back through the separator Sep_d but in the other direction, in order to be re-united and re-emitted toward the WDM PON.

During a step H8, a part of the amplified and flipped optical signal, carried by the bidirectional optical loop, is extracted between the amplifier Amp_d and the rotator Rot_d by the optical coupler Cpl_d.

During a step H9, the extracted optical signal is photo-detected by a diode D_d, in order to generate the electrical signal ES1.

A receiver device such as the device Rx_a, Rx_b, Rx_c, or Rx_d, whose descriptions have just been presented, may be incorporated into a receiver module forming part of optical line termination equipment (OLT) or of an optical network (ONT). Such a device may also be implemented in a piece of equipment distinct from the optical termination equipment, within equipment of the network dedicated or otherwise to the reception of signals from an optical distribution network.

The exemplary embodiments of the invention that have just been presented are only a few of the embodiments that may be envisioned. They show that the invention allows the reflector device needed for the operation of the wavelength self-seeding to be eliminated from the passive infrastructure of a "self-seeded" WDM PON. The reflector device according to the invention is moved to the termination equipment at the opposite end to the light source, and offers other advantages allowing the optical losses suffered along the light path to be reduced.

The invention claimed is:

1. A receiver device (Rx1_a, Rx1_b, Rx1_c, Rx1_d) designed to receive an optical signal ($\lambda 1$) emitted by a transmitter device (Tx1) comprising a light source for emission of the optical signal, the optical signal being transmitted by a passive optical network with wavelength division multiplexing, the receiver device being characterized in that it comprises:
    an optical amplifier (Amp_a, Amp_b, Amp_c, Amp_d) for amplifying the optical signal received from the transmitter device;
    an optical detector (D_b, D_d) designed to detect data in the amplified optical signal;
    an optical reflector (Ref_a, Ref_b) configured for reflecting the amplified optical signal toward the transmitter device, in order to seed the wavelength of the optical signal emitted by the transmitter device by means of a return path followed by the optical signal between the transmitter device and the optical reflector.

2. The receiver device (Rx1_a, Rx1_c) as claimed in claim 1, characterized in that the optical detector is integrated into the optical amplifier (Amp_a, Amp_c).

3. The receiver device (Rx1_b, Rx1_d) as claimed in claim 1, characterized in that the optical detector (D_b, D_d) is integrated into the optical reflector (Ref_b).

4. The receiver device (Rx1_c, Rx1_d) as claimed in claim 1, characterized in that the optical reflector comprises a polarization separator (Sep_c, Sep_d) and a polarization rotator by 180° (Rot_c, Rot_d), and in that the optical signal ($\lambda 1$) received is separated along axes of polarization so as to form a first separate signal ($\lambda 1\_1$) and a second separate signal ($\lambda 1\_2$), the polarization rotator and the optical amplifier (Amp_c, Amp_d) being disposed so as to form a loop with the polarization separator, the first separate signal running in one direction and the second separate signal running in the other direction, the two separate signals being re-united in the polarization separator so as to form an amplified optical signal sent back to the transmitter device.

5. The receiver device (Rx1_d) as claimed in claim 4, characterized in that the loop comprises a coupler disposed between the amplifier (Amp_d) and the rotator (Rot_d) in order to extract a part of the light and to direct it toward the optical detector (D_d).

6. An optical terminal comprising:
a receiver device (Rx1_a, Rx1_b, Rx1_c, Rx1_d) designed to receive a received optical signal ($\lambda 1$) emitted by an external transmitter device (Tx1) comprising an external light source for emission of the received optical signal, the received optical signal being transmitted by a passive optical network with wavelength division multiplexing, the receiver device being characterized in that it comprises:
an optical amplifier (Amp_a, Amp_b, Amp_c, Amp_d) for amplifying the received optical signal received from the external transmitter device forming an amplified received optical signal;
an optical detector (D_b, D_d) designed to detect data in the amplified received optical signal;
an optical reflector (Ref_a, Ref_b) configured for reflecting the amplified received optical signal toward the external transmitter device, in order to seed the wavelength of the received optical signal emitted by the external transmitter device by means of a return path followed by the received optical signal between the external transmitter device and the optical reflector; and
an internal transmitter device comprising an internal light source for the emission of a transmitted optical signal.

7. An optical transmission system comprising:
a transmitter device (Tx1) comprising a light source for the emission of an optical signal ($\lambda 1$), a passive optical network with wavelength division multiplexing transmitting the optical signal; and
a receiver device (Rx1_a, Rx1_b, Rx1_c, Rx1_d) designed to receive the optical signal ($\lambda 1$) emitted by the transmitter device (Tx1), the receiver device being characterized in that it comprises:
an optical amplifier (Amp_a, Amp_b, Amp_c, Amp_d) for amplifying the optical signal received from the transmitter device forming an amplified optical signal;
an optical detector (D_b, D_d) designed to detect data in the amplified optical signal; and
an optical reflector (Ref_a, Ref_b) configured for reflecting the amplified optical signal toward the transmitter device, in order to seed the wavelength of the received optical signal emitted by the transmitter device by means of a return path followed by the optical signal between the transmitter device and the optical reflector.

8. A method for receiving an optical signal emitted by a transmitter device comprising a light source for emission of the optical signal, a passive optical network with wavelength division multiplexing transmitting the optical signal, the method comprising the following steps:
reception (E1, F1, G1, H1) of the optical signal from the passive optical network;
amplification (E2, E5, F2, F5, G3, G6, H3, H6) of the optical signal received;
detection (E4, F4, G8, H9) of data in the amplified optical signal;
reflection (E3, F3) of the amplified signal toward the transmitter device, in order to seed the wavelength of the optical signal emitted by the transmitter device by means of a return journey of the optical signal with the transmitter device.

\* \* \* \* \*